(12) United States Patent
Ha et al.

(10) Patent No.: US 11,543,905 B1
(45) Date of Patent: Jan. 3, 2023

(54) DISPLAY DEVICE

(71) Applicant: Samsung Display Co., Ltd., Yongin-si (KR)

(72) Inventors: Seunghwa Ha, Cheongju-si (KR); Sangjae Kim, Seongnam-si (KR); Hyeong-Jun Kim, Suwon-si (KR); Seung-Ho Jung, Hwaseong-si (KR); In-Woo Jeong, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/708,753

(22) Filed: Mar. 30, 2022

(30) Foreign Application Priority Data

Jun. 15, 2021 (KR) ........................ 10-2021-0077605

(51) Int. Cl.
  *G06F 3/041* (2006.01)
(52) U.S. Cl.
  CPC .. *G06F 3/0412* (2013.01); *G06F 2203/04102* (2013.01)
(58) Field of Classification Search
  CPC ......... G06F 2203/04102; G06F 1/1652; G06F 1/1683
  See application file for complete search history.

(56) References Cited

U.S. PATENT DOCUMENTS

| 10,490,771 | B2 | 11/2019 | Kim et al. |
| 10,976,873 | B2 | 4/2021 | Shin et al. |
| 2017/0336831 | A1* | 11/2017 | Zhang .................... G06F 3/0446 |
| 2018/0053451 | A1* | 2/2018 | Han ......................... G09F 9/301 |
| 2018/0070460 | A1* | 3/2018 | Han ........................ G06F 1/1626 |
| 2019/0094916 | A1* | 3/2019 | Bi ........................... G06F 1/1652 |
| 2020/0209998 | A1 | 7/2020 | Shin et al. |

FOREIGN PATENT DOCUMENTS

| KR | 10-2019-0080740 | 7/2019 |
| KR | 10-2020-0029312 | 3/2020 |
| KR | 10-2020-0084495 | 7/2020 |

* cited by examiner

*Primary Examiner* — Robin J Mishler
(74) *Attorney, Agent, or Firm* — Kile Park Reed & Houtteman PLLC

(57) ABSTRACT

A display device according to an embodiment includes a digitizer, a display module disposed on the digitizer, and a support plate disposed between the digitizer and the display module, the support plate including an amorphous nickel alloy, and a range of about 50 wt % to about 95 wt % of nickel is included in the amorphous nickel alloy based on a total weight of the amorphous nickel alloy. The support plate has a non-magnetic property and a flexible property.

20 Claims, 8 Drawing Sheets

FIG. 2
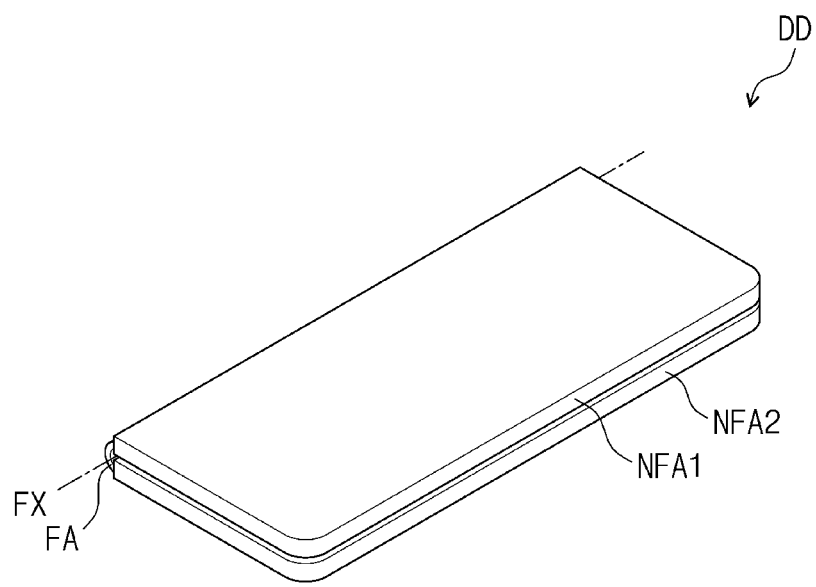
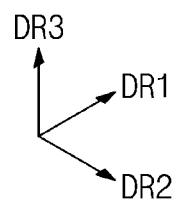

FIG. 3
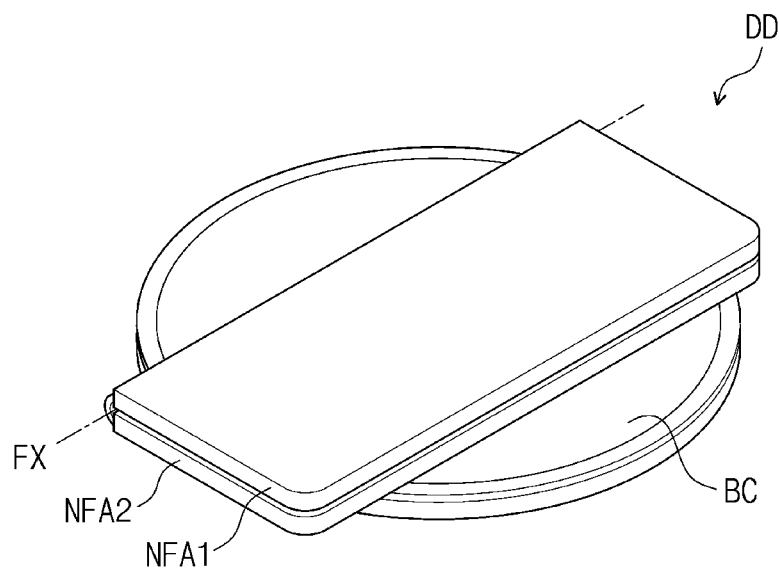
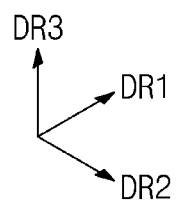

FIG. 7
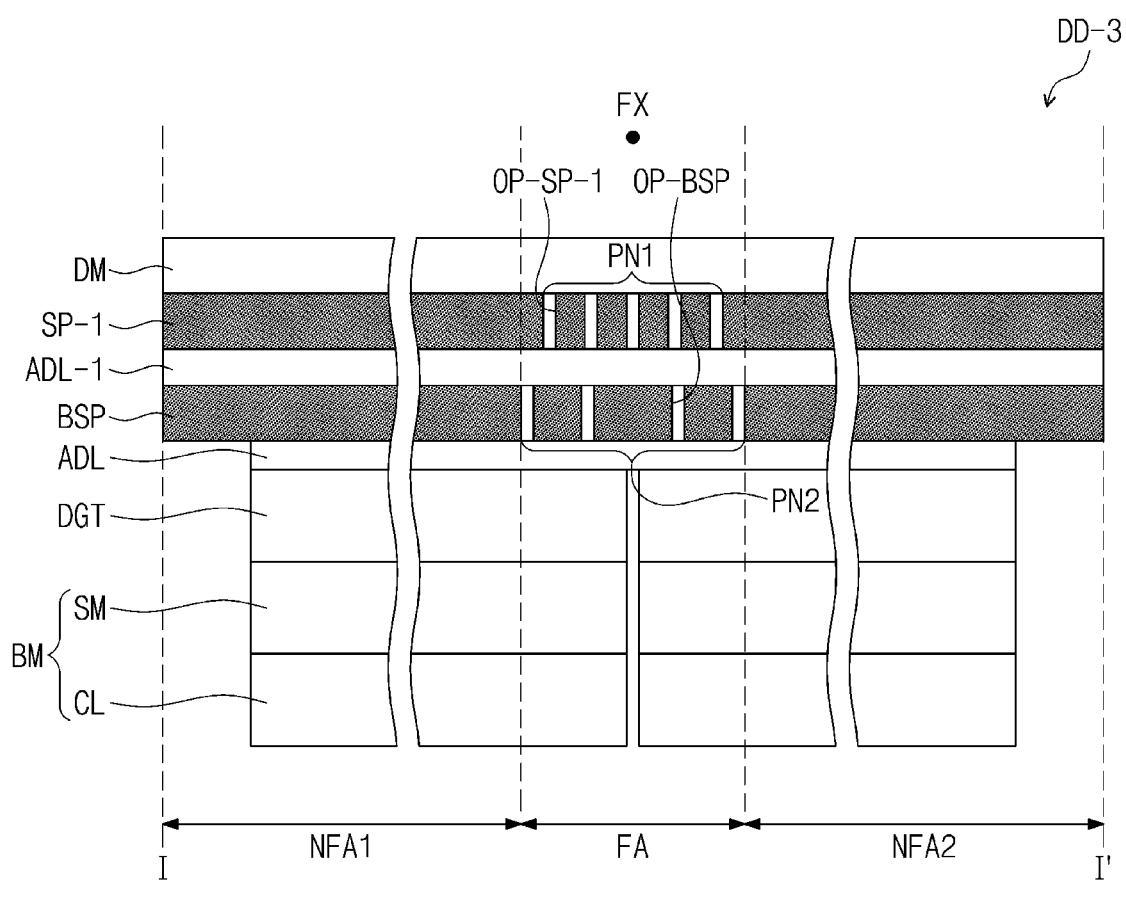
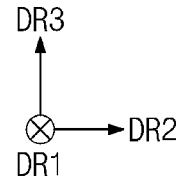

DISPLAY DEVICE

CROSS-REFERENCE TO RELATED APPLICATION(S)

This application claims priority to and benefits of Korean Patent Application No. 10-2021-0077605 under 35 U.S.C. § 119, filed on Jun. 15, 2021 in the Korean Intellectual Property Office, the entire contents of which are incorporated herein by reference.

BACKGROUND

1. Technical Field

The disclosure herein relates to a display device, and more, to a display device including a digitizer.

2. Description of the Related Art

Electronic devices such as televisions, mobile phones, tablet computers, navigation units, and game consoles are activated by receiving an electrical signal. Each of the electronic devices may include a display panel for displaying an image and a digitizer for sensing an input applied from the outside.

In recent years, research on a structure and a material for improving a sensitivity of the digitizer on an input applied from the outside are in progress. Also, unlike the typical electronic devices, a flexible electronic device such as a foldable electronic device additionally requires a flexibility of a component included therein.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device including a digitizer having an improved sensitivity on an external input and having a folding characteristic.

An embodiment provides a display device that may include a digitizer; a display module disposed on the digitizer; and a support plate disposed between the digitizer and the display module, the support plate including an amorphous nickel alloy, and a range of about 50 wt % to about 95 wt % of nickel may be included in the amorphous nickel alloy based on a total weight of the amorphous nickel alloy.

In an embodiment, the amorphous nickel alloy may further contain a range of about 0 wt % to about 3 wt % of iron (Fe) based on the total weight of the amorphous nickel alloy.

In an embodiment, the amorphous nickel alloy may further contain at least one of chrome, silicon, carbon, iron, and boron.

In an embodiment, the support plate may have a tensile strength in a range of about 1000 MPa to about 2000 MPa.

In an embodiment, the support plate may have a tensile strain in a range of about 1% to about 3%.

In an embodiment, the amorphous nickel alloy may be produced by electro-forming.

In an embodiment, the display device may further include a lower support plate disposed between the support plate and the digitizer, the lower support plate including the amorphous nickel alloy.

In an embodiment, the display device may further include a base member disposed below the digitizer, the base member including a cushion layer and a support part disposed between the cushion layer and the digitizer.

In an embodiment, the display device may further include a protection film disposed between the support plate and the display module.

In an embodiment, the digitizer may include a magnetic metal powder.

In an embodiment, a display device may include a folding area extending in a first direction; a first non-folding area and a second non-folding area spaced apart from each other in a second direction, with the folding area disposed between the first non-folding area and the second non-folding area; a base member; a support plate disposed on the base member and comprising an amorphous nickel alloy and in which of a plurality of openings are defined in overlap with the folding area; a digitizer disposed between the base member and the support plate; and a display module disposed on the support plate, and the amorphous nickel alloy has a non-magnetic property.

In an embodiment, the amorphous nickel alloy may further include a range of about 0 wt % to about 3 wt % of iron based on a total weight of the amorphous nickel alloy.

In an embodiment, a range of about 50 wt % to about 95 wt % of nickel may be included in the amorphous nickel alloy based on a total weight of the amorphous nickel alloy.

In an embodiment, the support plate may have a tensile strength in a range of about 1000 MPa to about 2000 MPa.

In an embodiment, the display device may further include a lower support plate disposed between the support plate and the digitizer, the lower support plate including the amorphous nickel alloy.

In an embodiment, a plurality of lower openings may be defined in the lower support plate overlapping the folding area of the display device.

In an embodiment, the lower openings may correspond to the openings of the support plate, respectively.

In an embodiment, a spaced distance between the openings in the second direction may be less than a spaced distance between the lower openings in the second direction.

In an embodiment, a width in the second direction of an opening pattern part in which the openings are defined in the support plate may be less than a width in the second direction of a lower opening pattern part in which the lower openings are defined in the lower support plate.

In an embodiment, the openings of the support plate may not overlap the lower openings of the lower support plate.

BRIEF DESCRIPTION OF THE DRAWINGS

The accompanying drawings are included to provide a further understanding of the disclosure, and are incorporated in and constitute a part of this specification. The drawings illustrate embodiments and, together with the description, serve to explain principles of the disclosure. In the drawings:

FIG. 2 is a schematic perspective view illustrating a folded state of the display device according to an embodiment;

FIG. 3 is a schematic perspective view illustrating an example of a charge state of the display device according to an embodiment;

FIG. 7 is a schematic cross-sectional view illustrating a display device according to an embodiment;

DETAILED DESCRIPTION OF THE EMBODIMENTS

Figure 1:
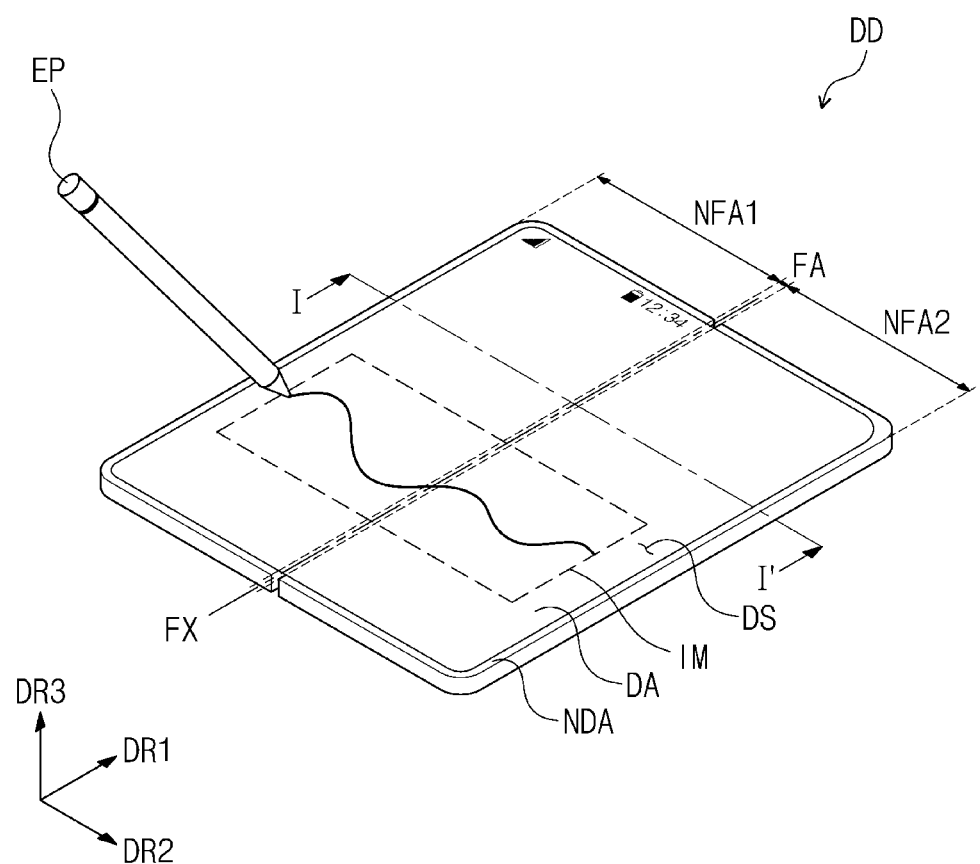
FIG. 1 is a schematic perspective view illustrating an unfolded state of a display device according to an embodiment.

Since the disclosure may have diverse modified embodiments, embodiments are illustrated in the drawings and are described in the detailed description of the disclosure. However, this does not limit the disclosure within embodiments illustrated herein and it should be understood that the disclosure covers and may include all of the modifications, equivalents, and replacements within the technical scope and spirit of the disclosure.

In this specification, it will also be understood that when one component (or region, layer, portion) is referred to as being 'on', 'connected to', or 'coupled to' another component, it can be directly disposed or connected or coupled on or to the one component, or an intervening third component may also be present.

In this application, it will be understood that when a layer, a film, a region, or a plate is referred to as being "directly disposed on" another layer, film, region, or plate, further another layer, film, region, or plate may not be present therebetween. For example, a feature of being "directly disposed" may represent that two layers or two members are disposed without using an additional member such as an adhesive member therebetween.

Like reference numerals refer to like elements throughout. Also, in the figures, the thickness, ratio, and dimensions of components are exaggerated for clarity of illustration.

The term "and/or" includes any and all combinations of one or more of the associated listed items. In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the spirit and scope of the disclosure and the appended claims.

The terms of a singular form may include plural forms unless referred to the contrary. For example, as used herein, the singular forms, "a," "an," and "the" are intended to include the plural forms as well, unless the context clearly indicates otherwise.

Also, '"under", "below", "above', "upper", and the like are used for explaining a relative association of components illustrated in the drawings. The terms may be a relative concept and described based on directions expressed in the drawings. In this specification, a feature of being "disposed on" may also represent a case when one component is disposed below another component in addition to a case when one component is disposed on another component.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as generally understood by those skilled in the art. Also, terms as defined in a commonly used dictionary should be construed as having the same meaning as in an associated technical context, and unless defined otherwise, the terms are not ideally or excessively construed as having a formal meaning.

Hereinafter, a display device according to an embodiment will be described with reference to the accompanying drawings.

FIG. 1 is a schematic perspective view illustrating an unfolded state of a display device according to an embodiment. FIG. 2 is a schematic perspective view illustrating a folded state of the display device according to an embodiment. FIG. 3 is a schematic perspective view illustrating an example of a charge state of the display device according to an embodiment.

Referring to FIG. 1, a display device DD according to an embodiment may display an image. In an embodiment, although the display device DD is illustrated as a smartphone, the display device DD may include various embodiments. For example, the display device DD according to an embodiment may include a tablet computer, a notebook computer, a personal computer, or a smart TV.

The display device DD may have two long sides in a first direction DR1 and short sides in a second direction DR2 crossing the first direction DR1. In case that viewed on a plane, the display device DD may have a curved edge portion. However, an embodiment is not limited to the shape of the display device DD. For example, the display device DD may have various shapes such as a circular shape, a polygonal shape, and a rectangular shape.

In this specification, the feature of "when viewed on a plane" may represent a state when viewed in a third direction DR3 perpendicular to a plane defined by the first direction DR1 and the second direction DR2.

The display device DD may include a display area DA and a non-display area NDA surrounding or adjacent to the display area DA. The display area DA may be an area for displaying an image. A display surface DS may define a top surface of the display area DA. The display device DD may provide an image to a user through the display surface IS. The non-display area NDA may be an area on which an image is not displayed. The non-display area NDA may define a bezel area of the display device DD.

According to an embodiment, the display device DD may be a flexible display device. For example, the display device DD may be a foldable display device. The display device DD may perform a folding operation and an unfolding operation around a folding axis FX.

By way of example, the display device DD may include a first non-folding area NFA1, a folding area FA, and a second non-folding area NFA2, which may be sequentially arranged or disposed in the second direction DR2, based on an operation state. The folding area FA may be disposed between the first non-folding area NFA1 and the second non-folding area NFA2.

Although the display device DD may include one folding area or a folding area FA and two non-folding areas NFA1 and NFA2 in FIG. 1, an embodiment is not limited to the number of each of the folding area FA and the non-folding areas NFA1 and NFA2. For example, the display device DD may include two or more non-folding areas and folding areas disposed therebetween.

The display device DD may sense an external input applied from the outside. The external input may include various types of inputs provided from the outside of the display device DD. For example, the external input may include a contact generated by a portion of a user's body such as hands and an external input (for example, hovering) that is applied by being adjacent to the display device DD or being disposed adjacent by a distance thereto. Also, the external input may have various types such as a force, a pressure, a temperature, and light.

FIG. 1 illustrates a state of inputting information to the display device DD by using a pen DP. An image IM may be drawn on the display surface DS of the display device DD by using the pen EP. The display device DD may sense the external input by electromagnetic resonance (EMR) caused by electromagnetic induction generated between the pen EP and an electric field generated in the display device DD. Although not shown, the pen EP may be mounted to and unmounted from an inner portion or an outer portion of the display device DD, and the display device DD may provide and receive a signal corresponding to the mounting and unmounting of the pen EP.

Referring to FIGS. 1 and 2, the display device DD may be folded around the folding axis FX. The folding axis FX may be a virtual line parallel to the first direction DR1. Here, a top surface of the first non-folding area NFA1 and a top surface of the second non-folding area NFA2 of the display device DD may face each other. Thus, the display surface of the display device DD may not be exposed to the outside. For example, the display device DD may be in-folded.

However, an embodiment is not limited to the folding operation of the display device DD. For example, the display devices DD may be out-folded so that the display surface DS is exposed to the outside.

Referring to FIG. 3, the display devices DD according to an embodiment may be disposed on a wireless charger BC and wireless-charged. The display devices DD according to an embodiment may be charged in a wireless charging method as a support plate SP (refer to FIG. 4) disposed on a digitizer DGT (refer to FIG. 4) contains a non-magnetic material.

The wireless charger BC may wireless-charge the display device DD in an inductive coupling method using a magnetic field. Although not shown, the wireless charger BC may include a transmitting coil (not shown), and the display device DD may include a receiving coil (not shown). In case that a current is applied to the transmitting coil (not shown), an electromagnetic field may be induced around the wireless charger BC. An induction current may be generated in the receiving coil (not shown) of the display device DD disposed on the wireless charger BC by the induced electromagnetic field. The induction current generated in the receiving coil (not shown) may charge the display device DD.

Although the second non-folding area NFA2 is disposed on or directly disposed on the wireless charger BC in the completely folded state of the display device DD according to an embodiment in FIG. 3, an embodiment is not limited thereto. For example, the display device DD according to an embodiment may be charged such that the first non-folding area NFA1 is disposed on or directly disposed on the wireless charger BC in a completely folded state, the first non-folding area NFA1, the folding area FA, and the second non-folding area NFA2 are disposed on or directly disposed on the wireless charger BC in the unfolded state, or the second non-folding area NFA2 is disposed on or directly disposed on the wireless charger BC in a folded state in which the first non-folding area NFA1 and the second non-folding area NFA2 are perpendicularly folded.

Figure 4:
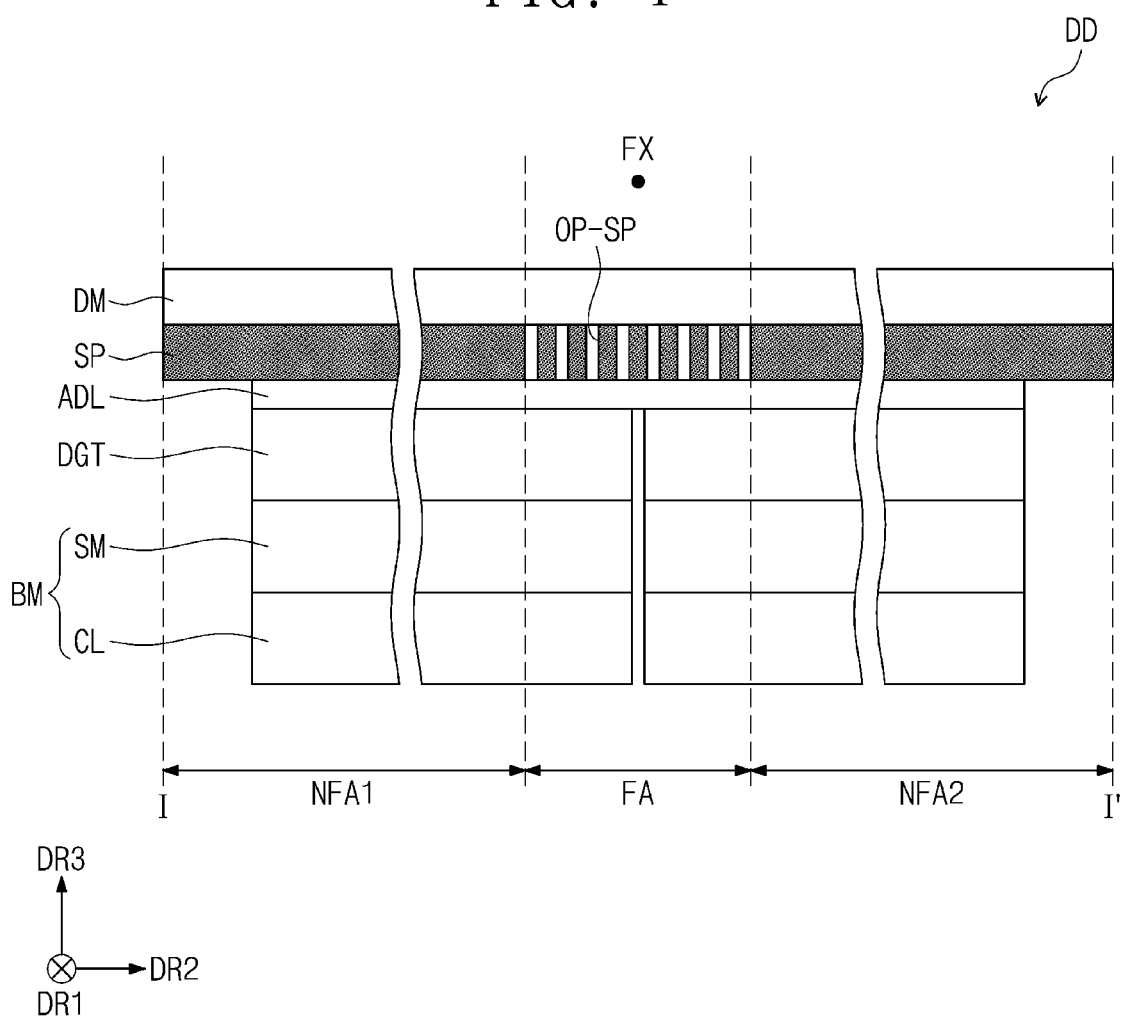
FIG. 4 is a schematic cross-sectional view illustrating the display device according to an embodiment.

FIG. 4 is a schematic cross-sectional view illustrating the display device according to an embodiment. FIG. 4 is a schematic cross-sectional view taken along line I-I' in the display device according to an embodiment in FIG. 1.

Referring to FIG. 4, the display device DD according to an embodiment may include a digitizer DGT, a display module DM, and a support plate SP. The digitizer DGT, the support plate SP, and the display module DM may be sequentially laminated in the third direction DR3 in the display device DD according to an embodiment.

In an embodiment, the digitizer DGT may be disposed below the support plate SP. An adhesive layer ADL may be disposed between the digitizer DGT and the support plate SP. The adhesive layer ADL may perform a function of bonding the digitizer DGT and the support plate SP. However, this is merely an example, and an embodiment is not limited thereto. For example, in the display device DD according to an embodiment, the adhesive layer ADL may be omitted, and the support plate SP may be disposed on or directly disposed on the digitizer DGT.

The digitizer DGT may sense a signal transmitted by the pen EP (refer to FIG. 1) among the external inputs. The digitizer DGT may sense the external input in an electromagnetic resonance (EMR) method. The EMR method may generate an electric field in a resonance circuit in the pen EP (refer to FIG. 1), the vibrating electric field may include a signal of lines included in the digitizer DGT, and a position of the pen EP (refer to FIG. 1) may be detected through the induced signal of the lines.

The digitizer DGT may have a sensitivity of the external input, which is varied according to properties of components disposed therearound. In case that a component having a magnetic property is disposed on the digitizer DGT, the component having the magnetic property may perform a shielding function, and thus the digitizer DGT may have a reduced sensitivity on the external input. The digitizer DGT may further include magnetic metal powder. The magnetic metal powder may reflect and block an electromagnetic signal except for the external input around the digitizer DGT to improve the sensitivity on the external input.

In an embodiment, the display module DM may be disposed above the digitizer DGT. The display module DM may function as an output device. For example, the display module DM may display an image on the display area DA (refer to FIG. 1), and the user may obtain information through the image. Also, the display module DM may function as an input device of sensing the external input applied to the display area DA (refer to FIG. 1).

In an embodiment, the support plate SP may be disposed between the digitizer DGT and the display module DM. The support plate SP may perform a function of supporting the display module DM disposed thereabove and a function of protecting the digitizer DGT disposed therebelow.

The support plate SP may include an amorphous nickel alloy. An amorphous alloy has irregular atom arrangement, unlike a crystalline alloy having a regular atom arrangement. The amorphous alloy may have a flexible property in comparison with the crystalline alloy. The amorphous nickel alloy may contain nickel by about 50% or more to about 95% or less to have a non-magnetic property. For example, the amorphous nickel alloy may simultaneously have the non-magnetic property and the flexible property in comparison with the crystalline alloy. Thus, the support plate including the amorphous nickel alloy may simultaneously have the non-magnetic property and the flexible property.

Since the support plate SP has the flexible property, the support plate SP may be applied to the flexible display device DD. However, this is merely an example, and an embodiment is not limited thereto. For example, the support plate SP may be applied to a rollable display device or a stretchable display device.

In case that the support plate SP has the magnetic property, the support plate SP may shield an electric signal to be transmitted to a component disposed therebelow and reduce the sensitivity of the digitizer DGT on the external input. However, the support plate SP having the non-magnetic property according to an embodiment may transmit an electric signal to the digitizer DGT instead of shielding the electric signal. For example, the support plate SP according to an embodiment may include the amorphous nickel alloy having the non-magnetic property and transmit a signal, which is provided as the external input, to the digitizer DGT without shielding the signal. Thus, the sensitivity of the digitizer DGT on the external input in the display device according to an embodiment may improve.

The amorphous nickel alloy included in the support plate SP according to an embodiment may contain a maximum weight of nickel based on a total weight of the amorphous nickel alloy. For example, the support plate SP according to an embodiment may include the amorphous nickel alloy containing about 50 wt % or more to about 95 wt % or less of nickel based on the total weight of the amorphous nickel alloy. In other words, the support plate SP according to an embodiment may include the amorphous nickel alloy containing a range of about 50 wt % to about 95 wt % of nickel based on the total weight of the amorphous nickel alloy In an embodiment, the amorphous nickel alloy may further include at least one of chrome, silicon, carbon, iron, and boron. For example, the amorphous nickel alloy may further include at least one of chrome, silicon, carbon, iron, and boron or two or more selected from the group consisting of chrome, silicon, carbon, iron, and boron.

In an embodiment, the amorphous nickel alloy may further contain greater than about 0 wt % to equal to or less than about 3 wt % of iron (Fe) based on the total weight of the amorphous nickel alloy. In other words, the amorphous nickel alloy may further contain a range of about 0 wt % to about 3 wt % of iron (Fe) based on the total weight of the amorphous nickel alloy In case that the amorphous nickel alloy contains greater than about 3 wt % of iron based on the total weight of the amorphous nickel alloy, the amorphous nickel alloy may have the magnetic property. In case that the support plate SP has the magnetic property, the support plate SP may block the external input to be transmitted to the digitizer DGT disposed therebelow. For example, as the amorphous nickel alloy of the support plate SP contains about 3 wt % or less of iron based on the total weight of the amorphous nickel alloy, the digitizer DGT disposed below the support plate SP may have the excellent sensitivity on the external input.

In an embodiment, the support plate SP may have a tensile strength of about 1000 MPa or more to about 2000 MPa or less. In other words, in an embodiment, the support plate SP may have a tensile strength in a range of about 1000 MPa to about 2000 MPa. In case that the tensile strength of the support plate SP is less than about 1000 MPa, the support plate SP of the display device DD may be readily deformed by a weight of a component disposed on the support plate SP and degraded in function of supporting the display module DM or the like within the spirit and the scope of the disclosure. In case that the tensile strength of the support plate SP is greater than about 2000 MPa, the folding operation of the display device DD is hardly realized.

In an embodiment, the support plate SP may have a tensile strain of about 1% or more to about 3% or less. In case that the tensile strain of the support plate SP is less than about 1%, the folding operation of the display device DD is hardly realized. In case that the tensile strain of the support plate SP is greater than about 3%, the support plate SP may be readily deformed by the weight of the component disposed on the support plate SP.

In an embodiment, the amorphous nickel alloy may be produced in an electro-forming method. In case that the amorphous nickel alloy is produced by using the electro-forming method, a tendency in which the magnetic property increases in a thermal treatment process may decrease in comparison with a case of producing the amorphous nickel alloy by using a rolling method. For example, the amorphous nickel alloy according to an embodiment, which is produced by using the electro-forming method, may maintain the non-magnetic property although thermally treated.

Referring to FIG. 4, openings OP-SP may overlap the folding area FA and be defined in the support plate SP according to an embodiment. As the openings OP-SP are defined in the support plate SP in overlap the folding area FA, a folding characteristic of the support plate SP may improve. For example, the number of a maximum folding operation of the display device DD according to an embodiment may increase.

The openings OP-SP may be spaced apart from each other in the second direction DR2. The openings OP-SP may have a same width as each other in the second direction DR2 or the first direction DR1. The openings OP-SP may have a uniform spaced distance in the second direction DR2. However, this is merely an example, and an embodiment is not limited thereto. For example, at least one of the openings OP-SP may have a different size, or the openings OP-SP may have a different spaced distance from each other in the second direction DR2.

In an embodiment, the display device DD may further include a base member BM disposed below the digitizer DGT. The base member BM may support the digitizer DGT. The base member BM may further include a cushion layer CL and a support part SM disposed between the cushion layer CL and the digitizer DGT. For example, the support part SM may be disposed closer to the digitizer DGT than the cushion layer CL. The cushion layer CL may absorb an external impact and protect a component disposed above the cushion layer CL from the external impact.

Figure 5:
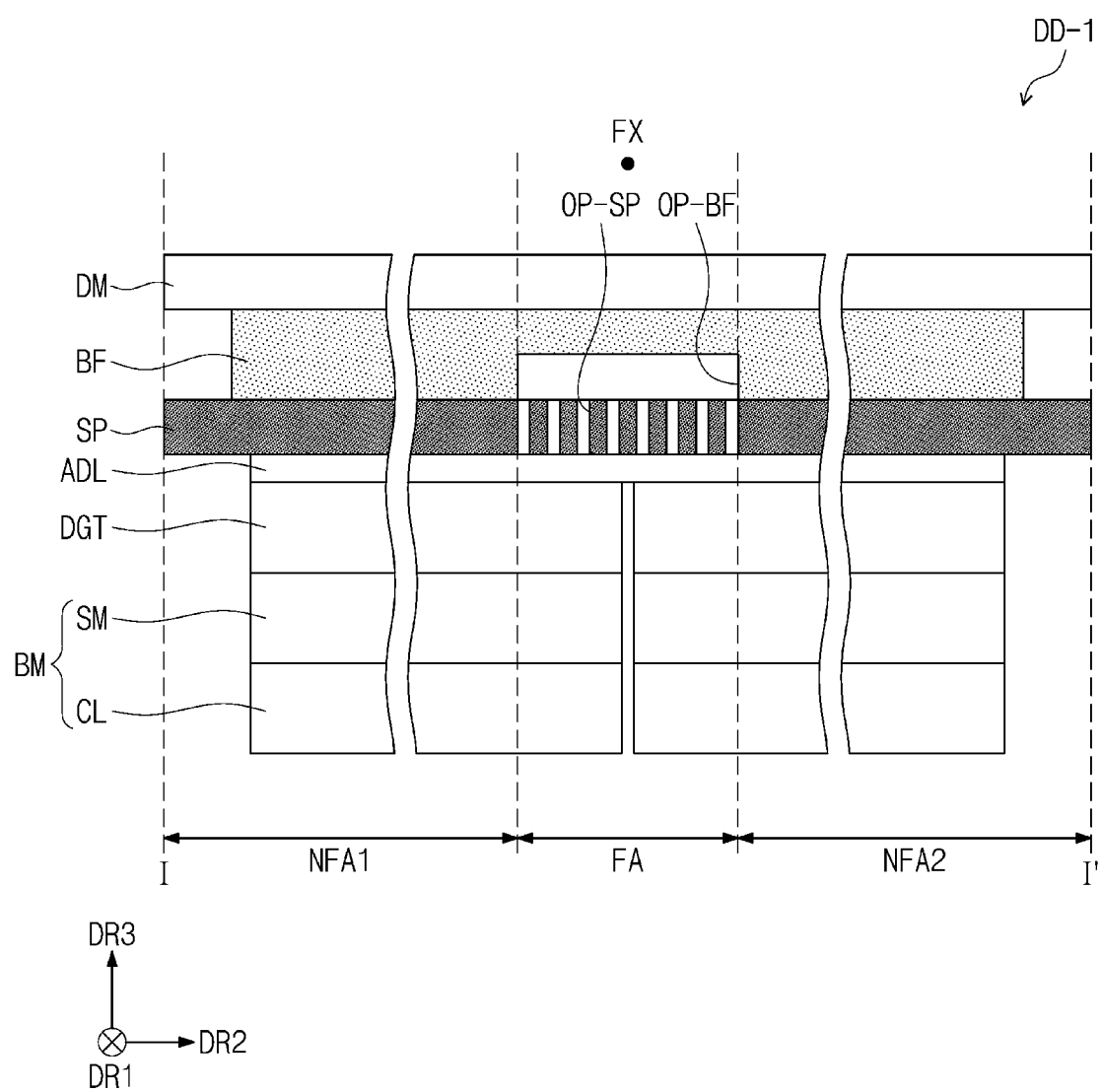
FIG. 5 is a schematic cross-sectional view illustrating a display device according to an embodiment.
Figure 6:
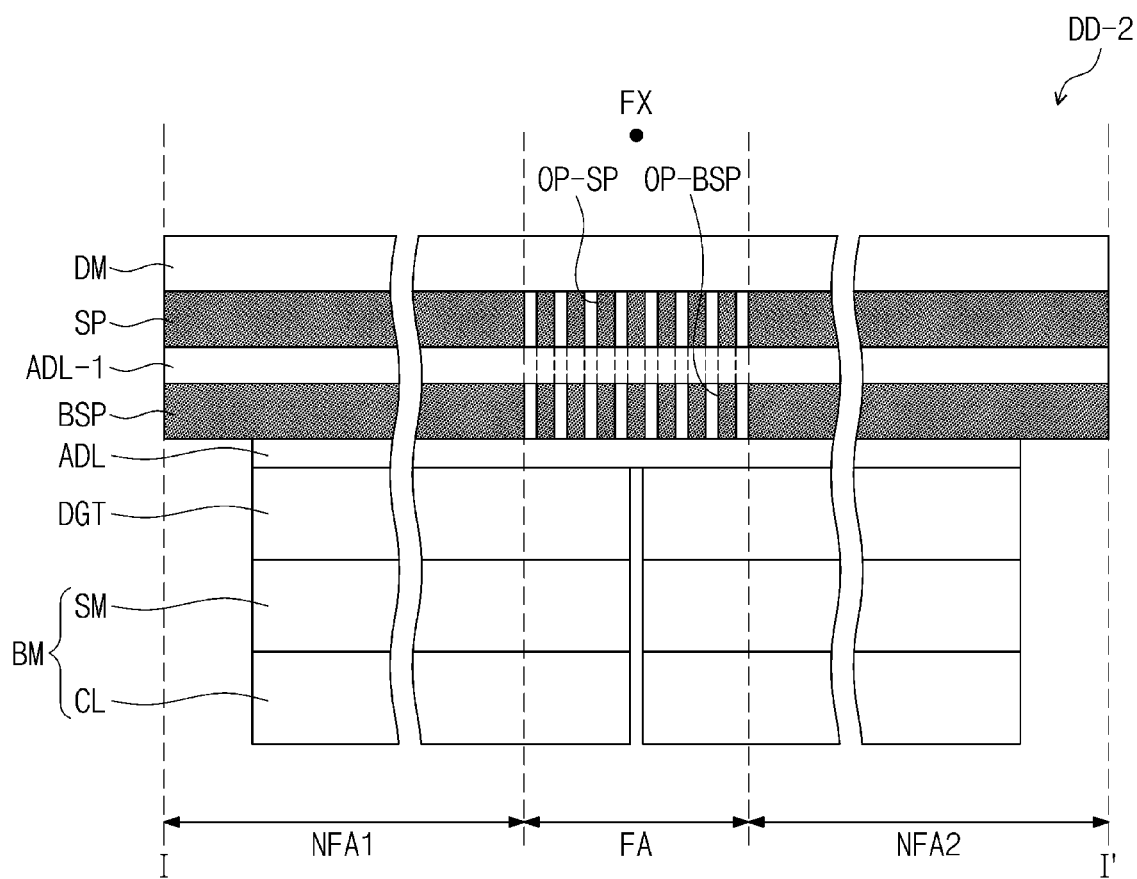
FIG. 6 is a schematic cross-sectional view illustrating a display device according to an embodiment.

FIGS. 5 to 7 are schematic cross-sectional views illustrating a display device according to an embodiment. Hereinafter, in case that the display device according to an embodiment is described with reference to FIGS. 5 to 7, the same feature described above with reference to FIGS. 1 to 4 are not described again, and different points will be described.

A display device DD-1 according to an embodiment in FIG. 5 is different in that the display device DD-1 further may include a protection film BF disposed between a display module DM and a support plate SP.

Referring to FIG. 5, the display device DD-1 according to an embodiment may further include the protection film BF disposed between the display module DM and the support plate SP. The protection film BF may be disposed between the display module DM and the support plate SP. In the protection film BF, a protection film opening OP-BF may be defined overlapping a folding area FA. The protection film opening OP-BF may overlap an opening OP-SP of the support plate SP.

The protection film BF may be disposed below the display module DM. The protection film BF may reduce a stress applied to the display module DM in case that the display device DD-1 is folded. For example, the protection film BF may prevent external moisture from being permeated into the display module DM and absorb an external impact.

A display device DD-2 and DD-3 according to an embodiment in FIGS. 6 and 7 is different in that the display device DD-2 and DD-3 further may include a lower support plate BSP disposed between a support plate SP and a digitizer DGT.

Referring to FIG. 6, the display device DD-2 according to an embodiment may further include the lower support plate BSP disposed between the support plate SP and the digitizer DGT. In FIG. 6, an adhesive layer ADL-1 may be disposed between the lower support plate BSP and the support plate SP. The adhesive layer ADL-1 may perform a function of bonding the lower support plate BSP and the support plate SP. However, this is merely an example, and an embodiment is not limited thereto. For example, in the display device DD-2 according to an embodiment, the adhesive layer ADL-1 may be omitted, and the support plate SP may be disposed on or directly disposed on the lower support plate BSP.

In case that an opening OP-SP is defined in a portion of the support plate SP, which overlaps a folding area FA, a deflection phenomenon of the support plate SP may be generated in the folding area FA by a load of the display module DM. The display device DD-2 according to an embodiment may improve the deflection phenomenon of the support plate SP in the folding area FA in comparison with a case of including only one support plate or a support plate SP by further including the lower support plate BSP.

The lower support plate BSP may include an amorphous nickel alloy. The amorphous nickel alloy included in the lower support plate BSP may have a non-magnetic property. In the amorphous nickel alloy included in the lower support plate BSP, about 50 wt % or more to about 95 wt % or less of nickel may be contained based on a total weight of the amorphous nickel alloy. In other words, the amorphous nickel alloy included in the lower support plate BSP, may be in a range of about 50 wt % to about 95 wt % of nickel based on a total weight of the amorphous nickel alloy The amorphous nickel alloy may further contain greater than about 0 wt % to equal to or less than about 3 wt % of iron (Fe) based on the total weight of the amorphous nickel alloy. In other words, the amorphous nickel alloy may further contain a range of about 0 wt % to about 3 wt % of iron (Fe) based on the total weight of the amorphous nickel alloy Lower openings OP-BSP may be defined in the lower support plate BSP in overlap the folding area FA. The lower openings OP-BSP may be spaced apart from each other in the second direction DR2. The lower openings OP-BSP may be defined in the lower support plate BSP by respectively corresponding to the openings OP-SP. However, this is merely an example, and an embodiment is not limited thereto. For example, the lower openings OP-BSP defined in the lower support plate BSP may not overlap the openings OP-SP of the support plate SP. In case that the lower openings OP-BSP are not in overlap the openings OP-SP of the support plate SP, the deflection phenomenon of the display module DM in the folding area FA may improve further than a case in which the lower openings OP-BSP respectively correspond to the openings OP-SP of the support plate SP.

Unlike the display device DD-2 in FIG. 6, a display device DD-3 according to an embodiment in FIG. 7 is different in that a spaced distance of openings OP-SP-1 defined in a support plate SP-1 in the second direction DR2 is greater than that of the lower openings OP-BSP defined in the lower support plate BSP in the second direction DR2.

Referring to FIG. 7, in the display device DD-3 according to an embodiment, a width in the second direction DR2 of an opening pattern part PN1 in the support plate SP-1, in which the openings OP-SP-1 are defined, may be less than that in the second direction DR2 of a lower opening pattern part PN2 in the lower support plate BSP, in which the lower openings OP-BSP are defined. In the display device DD-3 according to an embodiment, a spaced distance between the openings OP-SP-1 in the second direction DR2 may be less than that between the openings OP-BSP in the second direction DR2.

The support plate SP-1 may be disposed closer to the folding axis FX than the lower support plate BSP in the third direction DR3. A component close to the display device DD-3 may have a curvature radius that gradually decreases in a direction close to the folding axis FX. Thus, a curvature radius of the support plate SP-1 may be less than that of the lower support plate BSP in case that a folding operation of the display device DD-3 is performed. A width in the second direction DR2 of the opening pattern part PN1 defined in the support plate SP-1 in correspondence to the curvature radius may be less than that in the second direction DR2 of the lower opening pattern part PN2 defined in the lower support plate BSP. As a result, the display device DD-3 according to an embodiment may have a folding characteristic better than a case in case that the opening pattern part PN1 and the lower opening pattern part PN2 have a same width in the second direction DR2.

Figure 8:
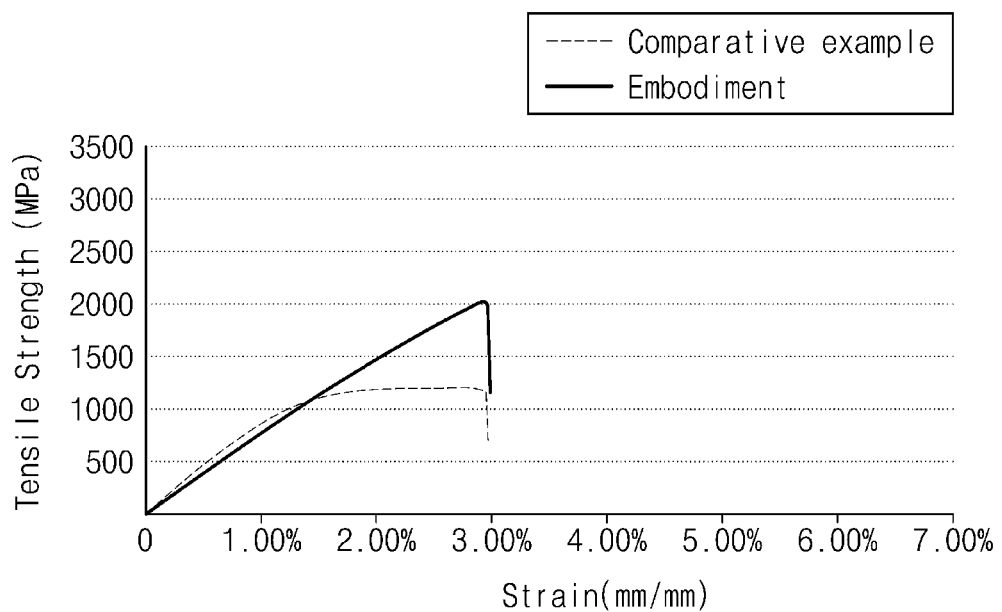
FIG. 8 is a graph showing a relationship between a stress and a strain of the display device according to an embodiment and a display device according to a comparative example.

FIG. 8 is a graph showing a relationship between a stress and a tensile strain of the support plate according to an embodiment and a support plate according to a comparative example. The support plate of the comparative example is manufactured by using SUS 304, and the support plate of the embodiment is manufactured by using an amorphous nickel alloy.

Referring to FIG. 8, the support plate of the comparative example has a tensile strength of about 1000 MPa, and the support plate of the embodiment has a tensile strength of about 2000 MPa. The tensile strength is a value obtained by dividing a maximum load sustaining in case that a specimen used in a tensile test is pulled to be cut by a cross-section of a material. For example, since the support plate of the comparative example has a tensile strength of about 1000 MPa, and the support plate of the embodiment has a tensile strength of about 2000 MPa, the support plate of the embodiment may support a greater load than the support plate of the comparative example. For example, it may be understood that the support plate of the embodiment has an excellent strength in comparison with the support plate of the comparative example.

Also, referring to FIG. 8, all of the tensile strains of the support plates of the embodiment and the comparative example are about 3.00%. The tensile strain is a ratio of a length varied after an external force is applied to a length before the external force is applied to a specific or given member. It is determined that the support plate of the comparative example and the support plate of the embodiment have a same level in the tensile strain.

The support plate of the embodiment has a same level tensile strain as and a greater tensile strength than those of the support plate of the comparative example. Thus, as the support plate of the embodiment has a same level tensile strain as and the greater tensile strength than those of the support plate of the comparative example, the support plate of the embodiment has a more excellent mechanical strength than that of the support plate of the comparative example while having a similar flexibility to that of the support plate of the comparative example.

Figure 9:
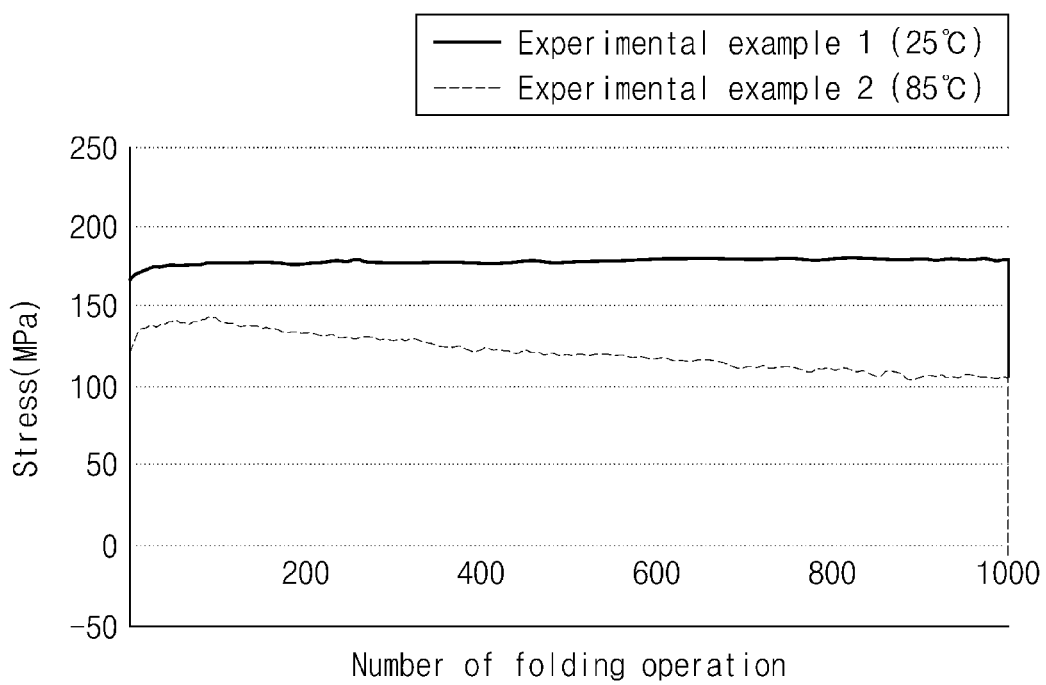
FIG. 9 is a graph showing a stress and the number of folding operations according to a temperature of the display device according to an embodiment.

FIG. 9 is a graph showing the tensile strength and the number of folding operations according to a temperature of the display device according to an embodiment. In FIG. 9, an experimental example 1 measures a stress while repeating a folding operation of the display device including the support plate according to an embodiment at a temperature of about 25° C., and an experimental example 2 measures a stress while repeating a folding operation of the display device including the support plate according to an embodiment at a temperature of about 85° C. The support plate of the embodiment is the support plate according to an embodiment, which is manufactured by using the amorphous nickel alloy. In case that the stress of the support plate while the folding operation of the display device is repeated is small, the support plate may be applied to a foldable device.

Referring to FIG. 9, it may be understood that the display device including the support plate of the embodiment maintains the stress at a similar level although the folding operations are repeated at each of the temperatures of about 25° C. and about 85° C. Through this, it may be understood that the support plate of an embodiment has an excellent folding characteristic.

The display device according to an embodiment may have the non-magnetic property and the flexible property by including the support plate disposed on the digitizer and including the amorphous nickel alloy. Thus, the display device according to an embodiment may have the improved sensitivity of the digitizer to the external input by including the support plate having the non-magnetic property and the flexible property. Also, the display device according to an embodiment may exhibit the excellent folding characteristic by including the support plate including the amorphous nickel alloy.

Although embodiments of the disclosure have been described, it is understood that the disclosure should not be limited to these embodiments but various changes and modifications can be made by one of ordinary skill in the art within the spirit and scope of the disclosure as hereinafter claimed.

Hence, the scope of the disclosure shall be determined by the technical scope of the accompanying claims.

What is claimed is:

1. A display device comprising:
a digitizer;
a display module disposed on the digitizer; and
a support plate disposed between the digitizer and the display module, the support plate comprising an amorphous nickel alloy,
wherein a range of about 50 wt % to about 95 wt % of nickel is included in the amorphous nickel alloy based on a total weight of the amorphous nickel alloy.

2. The display device of claim 1, wherein the amorphous nickel alloy further contains a range of about 0 wt % to about 3 wt % of iron (Fe) based on the total weight of the amorphous nickel alloy.

3. The display device of claim 1, wherein the amorphous nickel alloy further contains at least one of chrome, silicon, carbon, iron, and boron.

4. The display device of claim 1, wherein the support plate has a tensile strength in a range of about 1000 MPa to about 2000 MPa.

5. The display device of claim 1, wherein the support plate has a tensile strain in a range of about 1% to about 3%.

6. The display device of claim 1, wherein the amorphous nickel alloy is produced by electro-forming.

7. The display device of claim 1, further comprising:
a lower support plate disposed between the support plate and the digitizer, the lower support plate comprising the amorphous nickel alloy.

8. The display device of claim 7, further comprising:
a base member disposed below the digitizer, the base member comprising a cushion layer and a support part disposed between the cushion layer and the digitizer.

9. The display device of claim 1, further comprising:
a protection film disposed between the support plate and the display module.

10. The display device of claim 1, wherein the digitizer comprises a magnetic metal powder.

11. A display device comprising:
a folding area extending in a first direction;
a first non-folding area and a second non-folding area spaced apart from each other in a second direction, with the folding area disposed between the first non-folding area and the second non-folding area;
a base member;
a support plate disposed on the base member and comprising an amorphous nickel alloy and in which a plurality of openings overlapping the folding area;
a digitizer disposed between the base member and the support plate; and
a display module disposed on the support plate,
wherein the amorphous nickel alloy has a non-magnetic property.

12. The display device of claim 11, wherein the amorphous nickel alloy further includes a range about 0 wt % to about 3 wt % of iron based on a total weight of the amorphous nickel alloy.

13. The display device of claim 11, wherein a range of about 50 wt % to about 95 wt % of nickel is included in the amorphous nickel alloy based on a total weight of the amorphous nickel alloy.

14. The display device of claim 11, wherein the support plate has a tensile strength in a range of about 1000 MPa to about 2000 MPa.

15. The display device of claim 11, further comprising:
a lower support plate disposed between the support plate and the digitizer, the lower support plate comprising the amorphous nickel alloy.

16. The display device of claim 15, wherein a plurality of lower openings are defined in the lower support plate in overlap with the folding area of the display device.

17. The display device of claim 16, wherein the lower openings correspond to the openings of the support plate, respectively.

18. The display device of claim 16, wherein a spaced distance between the openings in the second direction is less than a spaced distance between the lower openings in the second direction.

19. The display device of claim 16, wherein a width in the second direction of an opening pattern part in which the openings are defined in the support plate is less than a width in the second direction of a lower opening pattern part in which the lower openings are defined in the lower support plate.

20. The display device of claim 16, wherein the openings of the support plate do not overlap the lower openings of the lower support plate.

\* \* \* \* \*